United States Patent
Kirwan et al.

(10) Patent No.: US 6,655,130 B1
(45) Date of Patent: Dec. 2, 2003

(54) SYSTEM AND CONTROLS FOR NEAR ZERO COLD START TAILPIPE EMISSIONS IN INTERNAL COMBUSTION ENGINES

(75) Inventors: John E. Kirwan, Troy, MI (US); Malcolm James Grieve, Fairport, NY (US); Ather A. Quader, Sterling Heights, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/702,992

(22) Filed: Oct. 30, 2000

(51) Int. Cl.[7] .................................................. F01N 3/00
(52) U.S. Cl. ........................... 60/284; 60/274; 60/286; 60/303; 123/3; 123/DIG. 12
(58) Field of Search ................... 60/274, 303; 284/275, 284/286, 295, 649, 676; 123/3, 1 A, DIG. 12; 429/9; 422/111, 182, 183

(56) References Cited

U.S. PATENT DOCUMENTS

| | | | |
|---|---|---|---|
| 3,986,350 A | * 10/1976 | Schmidt | 60/286 |
| 4,185,595 A | * 1/1980 | Muhlberg | 123/3 |
| 4,210,103 A | * 7/1980 | Dimitroff et al. | 123/3 |
| 4,230,072 A | * 10/1980 | Noguchi et al. | 123/1 A |
| 4,520,764 A | * 6/1985 | Ozawa et al. | 123/3 |
| 4,576,617 A | * 3/1986 | Renevot | 60/286 |
| 4,644,751 A | * 2/1987 | Hsu | 60/676 |
| 5,007,381 A | * 4/1991 | Kakegawa et al. | 123/3 |
| 5,272,871 A | * 12/1993 | Oshima et al. | 60/286 |
| 5,343,699 A | * 9/1994 | McAlister | 123/3 |
| 5,412,946 A | * 5/1995 | Oshima et al. | 60/286 |
| 5,437,250 A | * 8/1995 | Rabinovich et al. | 123/3 |
| 5,813,222 A | * 9/1998 | Appleby | 60/286 |
| 5,829,248 A | * 11/1998 | Clifton | 60/286 |
| 5,887,554 A | * 3/1999 | Cohn et al. | 123/3 |
| 5,921,076 A | * 7/1999 | Krutzsch et al. | 60/286 |
| 5,939,025 A | * 8/1999 | Ahmed et al. | 422/111 |
| 5,947,063 A | * 9/1999 | Smith et al. | 123/3 |
| 5,953,908 A | * 9/1999 | Appleby | 60/275 |
| 5,964,089 A | * 10/1999 | Murphy et al. | 60/286 |
| 6,122,909 A | * 9/2000 | Murphy et al. | 60/286 |
| 6,138,454 A | * 10/2000 | Fournier et al. | 60/286 |
| 6,176,078 B1 | * 1/2001 | Balko et al. | 60/275 |
| 6,230,494 B1 | * 5/2001 | Botti et al. | 60/649 |
| 6,255,008 B1 | * 7/2001 | Iwase | 429/9 |
| 6,318,306 B1 | * 11/2001 | Komatsu | 123/3 |
| 6,405,720 B1 | * 6/2002 | Collier, Jr. | 123/3 |

OTHER PUBLICATIONS

Ahmed et al., "Catalytic Partial Oxidation Reforming of Hydrocarbon Fuels," 1998 Fuel Cell Seminar, Palm Springs, California, Nov. 1998.*

* cited by examiner

Primary Examiner—Thomas Denion
Assistant Examiner—Tu M. Nguyen
(74) Attorney, Agent, or Firm—Jimmy L. Funke

(57) ABSTRACT

An integrated fuel reformer-engine system and method provides an on-board fuel reformer for preparing a hydrogen-rich reformate; an engine operating on one or a combination of reformate and liquid fuel, in combination with an exhaust catalyst for treating engine exhaust. The supply of air, reformate, and liquid fuel to the engine and exhaust catalyst is metered so as to provide low hydrocarbon and NOx emissions over a range of operating conditions from cold-start and idle through vehicle road-loads. In one embodiment, the system provides near-zero cold start hydrocarbon and NOx emissions with ultra-lean start using substantially 100% reformate fueling. In another embodiment, accelerated catalyst heating is provided by supplying reformate mixed with engine exhaust to the catalyst. Alternately, an ignition source is employed to ignite the engine exhaust or reformate-exhaust mixture. In another embodiment, the present system provides ultra-low NOx emissions at light and mid loads using extreme dilution and partial reformate fueling.

8 Claims, 2 Drawing Sheets

SYSTEM AND CONTROLS FOR NEAR ZERO COLD START TAILPIPE EMISSIONS IN INTERNAL COMBUSTION ENGINES

TECHNICAL FIELD

The present invention relates to reduction of hydrocarbon and nitrogen oxide engine emissions, and more particularly relates to an integrated fuel reformer-engine system and method for providing low hydrocarbon and nitrogen oxide emissions in internal combustion engines over a range of operating conditions.

BACKGROUND OF THE INVENTION

Atmospheric pollution generated by exhaust emissions from conventional gasoline and diesel powered internal combustion engines has caused both federal and state governments to enact laws and establish regulations which impose ever greater restrictions on the performance of motor vehicles in the areas of exhaust gas emission and fuel economy. For example, California Ultra Low Emission Vehicle (ULEV II) emissions standards include a Super Ultra Low Emission Vehicle (SULEV) emissions standard. In normal, light load, summer operating conditions represented by the U.S. FTP (United States Federal Test Procedure), a vehicle developed and certified to the SULEV level emits extraordinarily low emissions. Gasoline-fueled vehicles that robustly meet SULEV standards over their useful lives (and under real-world conditions) would offer a significant step toward eliminating the automobile as a source of regulated pollutants.

Vehicles operating on hydrogen-enriched fuels are attractive as low-emissions vehicles. Hydrogen-enriched fuels can be produced from a variety of sources, including gasoline. And hydrogen-enriched fuels have several attributes enabling near-zero vehicle emissions, including: a fuel source that contains no hydrocarbons for near-zero hydrocarbon emissions; the ability to promote rapid catalyst heating to improve exhaust catalyst light-off; and the ability to operate under ultra-lean/high EGR conditions to greatly reduce NOx emissions.

Hydrogen fuel can be dispensed to the vehicle and stored on-board, or hydrogen can be produced on-board the vehicle with an on-board reformer. Currently, sufficient infrastructure is lacking for widespread use of vehicles with hydrogen stored on-board, and significant technical challenges remain to provide an attractive on-board storage method. With on-board reforming, hydrogen enriched fuel can be produced from gasoline (as well as other liquid or gaseous fuels). On-board reforming of gasoline generally requires reaction temperatures of roughly 600° C. to 900° C. typically in the presence of a catalyst, to ensure that the reactions provide high hydrogen yields and inhibit the formation of soot. The gasoline itself provides the necessary energy to reach the steady-state reaction temperature requirements.

What is needed in the art is a system that is capable of robustly meeting SULEV emissions criteria over the range of real-world operating conditions. What is further needed in the art is a system and method that enables reduction of hydrogen and nitrogen oxide (NOx) emissions to near zero at cold start through to periods of vehicle road loads. What is further needed in the art is a system and method for reducing exhaust emissions while providing fuel economy and overall engine efficiency. What is further needed is such a low emissions system that can be adapted to a variety of vehicle types, including larger, higher emitting vehicles, such as those employing diesel engines.

SUMMARY OF THE INVENTION

The present invention provides a low-emissions integrated fuel reformer-engine system and method. In one embodiment, the present system and method provide near-zero cold start hydrocarbon and NOx emissions with ultra-lean start using substantially 100% reformate fueling. In another embodiment, the present system and method provide accelerated catalyst heating using reformate supplied to the exhaust. In another embodiment, the present system and method provide ultra-low NOx emissions at light and mid loads using extreme dilution (lean fuel or exhaust gas recirculation) and partial reformate fueling.

The present system comprises an on-board fuel reformer for receiving a supply of hydrogen-containing liquid fuel, such as gasoline, and a supply of air and converting the same into a hydrogen-rich reformate fuel; an engine having a reformate intake, a liquid fuel intake, an air intake, and an exhaust outlet; an exhaust catalyst having an intake for receiving engine exhaust, reformate, or a combination thereof, and an outlet for discharging engine exhaust after treatment. Control means meter the supply of air and fuel intake in the form of reformate alone or a blend of liquid fuel and reformate supplied to the engine, and the supply of reformate to the exhaust catalyst so as to provide low hydrocarbon and NOx emissions over a range of operating conditions from cold-start to vehicle road-loads. The control means is configured to provide low emissions in combination with optimized fuel economy and system efficiency. In an alternate embodiment, a small supply of reformate, such as bottled reformate gas, is stored on-board for use during warm-up of the on-board reformer or other periods when the on-board-reformer is not operational.

The present method comprises producing hydrogen-rich reformate fuel with an on-board fuel reformer, fueling the engine with reformate, a liquid fuel, or a combination thereof, and treating the engine exhaust, reformate, or a combination thereof, in the exhaust catalyst. The method comprises controlling the supply of one or a combination of reformate, liquid fuel, and air to the engine and exhaust catalyst to achieve low hydrocarbon and NOx emissions over a range of engine operating conditions including cold-start, idle, and road-loads.

In a preferred embodiment, accelerated catalyst heating is employed to rapidly bring the exhaust catalyst up to operating temperature. In one embodiment, accelerated catalyst heating is by supplying reformate or a mixture of reformate and engine exhaust to the exhaust catalyst for a time sufficient to warm the exhaust catalyst to operational temperature. In another embodiment, accelerated catalyst heating comprises igniting the engine exhaust with an ignition source disposed between the engine exhaust outlet and the exhaust catalyst and heating said exhaust catalyst therewith.

The present reformer-based system uses on-board partial oxidation fuel reforming (POx) in combination with catalytic after-treatment of exhaust to provide near-zero engine-out emissions over a range of operating conditions including cold-start. Further, the present system is adaptable to a broad spectrum of engines and vehicles. Efficient fuel reforming further enables both very low emissions and improved fuel economy. The present system allows reduced precious metal loading rates to the catalyst over prior systems and allows the catalyst to be located further downstream in the exhaust (for a less harsh environment) than after-treatment-based SULEV systems. The present system further provides near-zero cold start emissions even with poor volatility fuels and at very cold ambient temperatures.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Figure 1:
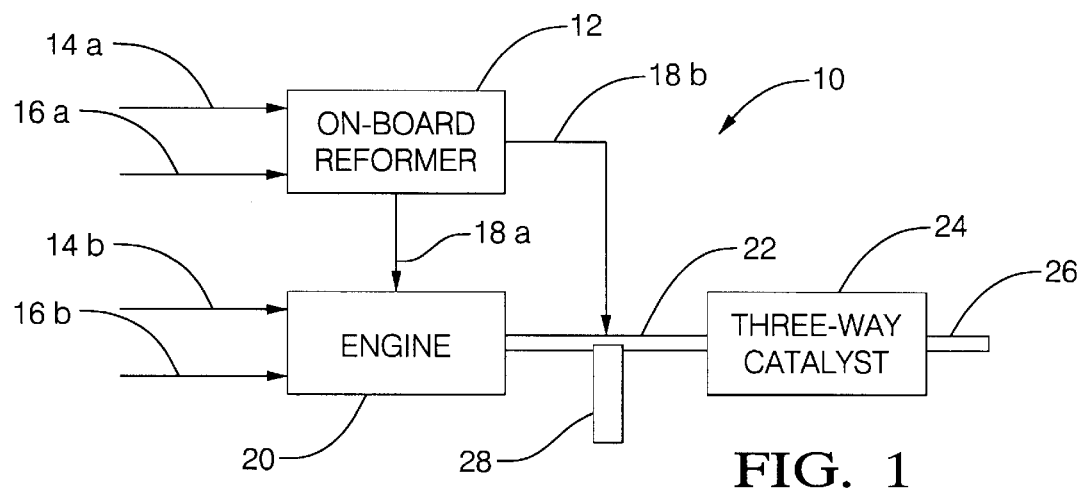
FIG. 1 is a block schematic showing one embodiment of a reformer-based cold start system in accordance with the present invention.

FIG. 1 provides a schematic block diagram of one possible embodiment of an integrated fuel-reformer-engine system in accordance with the present invention. System 10 includes on-board fuel reformer 12 for receiving a supply of hydrogen-containing liquid fuel, such as gasoline 14$a$, and a supply of air 16$a$ and converting same into hydrogen-rich reformate 18$a$, 18$b$. As used herein, reformate means a gaseous blend of hydrogen, carbon monoxide and nitrogen (ignoring trace components). Engine 20 has a reformate intake for receiving reformate 18$a$, a liquid fuel intake for receiving liquid fuel such as gasoline 14$b$ an air intake for receiving air 16$b$, and an exhaust outlet for passing engine exhaust 22. A catalytic after-treatment system, such as threeway exhaust catalyst 24, has an intake for receiving engine exhaust 22, reformate 18$b$, or a combination thereof, and an outlet for discharging a stream 26 after treatment. Control means (not shown) meter the supply of air 14$a$, 14$b$ and the supply of one or a combination of reformate 18$a$ and gasoline 14$b$ to the engine 20 and reformer 12 and the supply of reformate 18$b$ to the exhaust catalyst 24 so as to provide low hydrocarbon and NOx emissions over a range of operating conditions from cold-start through to high engine loads.

Engine 20 is represented as a block without showing various details of engine 20 that do not form part of the present invention. Engines having varying configurations may be employed in the present system, such as, but not limited to, spark ignition engines, hybrid vehicles employing spark ignition engines, and diesel engines. Control means used herein may comprise any of various control means known in the art for providing air and fuel control and metering functions. For example, as known in the art, control means to monitor reformer, engine, and exhaust catalyst conditions may employ signal connections to various sensors, such as air flow sensors, throttle position sensors, oxygen sensors, exhaust and catalyst temperature sensors, and the like, and use feedback control to operate the system in accordance with the present invention. Control means may be implemented programmatically or by direct electrical connection through customized integrated circuits, or a combination thereof, using methods known in the art.

The present system optimizes emissions reduction by using on-board reformer 12 in combination with exhaust catalyst 24. Preferably, on-board reformer 12 is kept as small as possible. Reformer 12 may comprise any of various reformer technologies known in the art, including, but not limited to, catalytic POx reformers, plasma-torch based reformers, and solid oxide fuel cell (SOFC) reformer technology. Catalytic reformers comprise generally a catalyst, fuel and air metering devices to supply the fuel-rich mixture, and, optionally, an ignition source to initiate the POx reaction. Under steady state conditions, catalytic POx reformer efficiency is very near the ideal limit of about 85% (about 15% of the gasoline lower heating value is lost to heat in the POx reaction). However, parasitic losses to provide fuel and air to the reformer 12 will reduce overall efficiency from this ideal. Preferably, hot water, and more preferably, exhaust gas, is recirculated through the POx reformer 12 to capture waste energy and increase reformer 12 efficiency.

Very low cold-start emissions require fast heating of the reforming catalyst to rapidly start-up the reformer and provide good quality reformate quickly. Preferably, reformer catalyst size and thermal mass are small to enhance fast heating. In an alternate embodiment, the present system and method may comprise on-board catalytic reforming of alcohol fuels such as methanol. In this embodiment, lower reformer temperatures allow the endothermic process to be primarily driven by waste heat.

In a plasma-torch POx reformer, air is metered into a plasma generator located upstream of a combustor. High voltage is applied to the air stream forming high temperature plasma. This high temperature plasma torch flows into the combustor, initiating vigorous combustion of a rich fuel-air mixture. With the plasma-torch POx reformer, POx reactions occur in the high temperature gas phase created by the plasma obviating the need for a reforming catalyst. The plasma-torch POx reformer lights off instantly because the gas phase POx reactions go to completion essentially immediately even during combustor heat up. Thus, the plasma-torch POx reformer offers the advantages of fast light off and obviates catalyst durability issues.

The present invention further encompasses using SOFC fuel reforming technology. In an SOFC system, gasoline reformed to feed the SOFC may also serve as reformate to fuel the engine 20. To minimize thermal cycling, it is preferable to heavily insulate the SOFC and continuously maintain the SOFC at high temperatures even when the vehicle is not in use. During engine shutdown, the SOFC may continue generating electricity and producing reformate in the form of anode tail gas. During cold-start, the SOFC anode tail gas becomes an instant source of reformate for the engine 20 for near-zero emissions cold-starts.

While on-board storage of reformate presents significant disadvantages related to cost and system complexity, one embodiment of the present system includes a small on-board supply of reformate, such as bottled reformate gas or hydrogen (not shown in FIG. 1) to provide reformate until the on-board reformer is operational.

Figure 2:
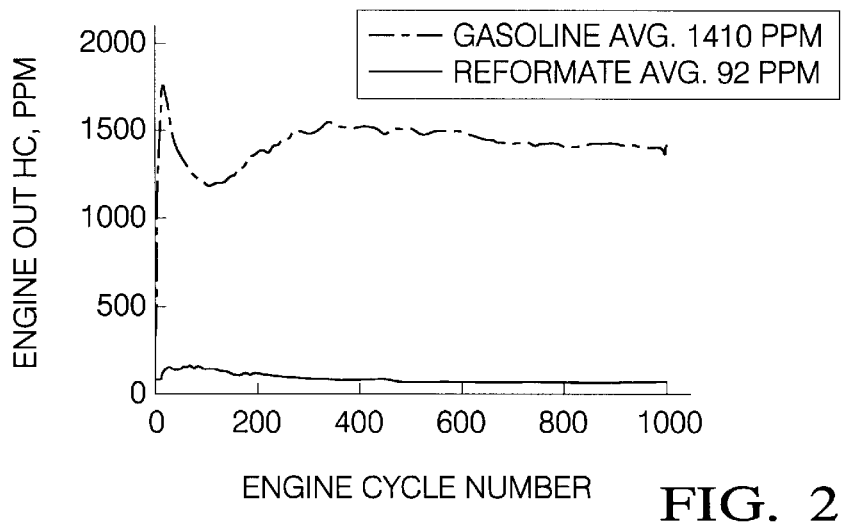
FIG. 2 is a graph showing cold-start hydrocarbon emissions using gasoline fueling compared with cold-start hydrocarbon emissions with reformate fueling.
Figure 3:
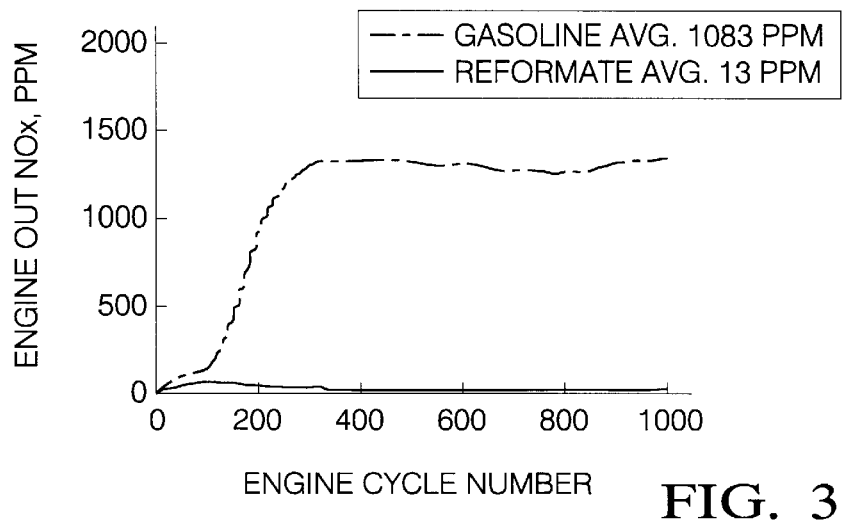
FIG. 3 is a graph showing cold-start NOx emissions using gasoline fueling compared with cold-start NOx emissions with reformate fueling.

The present reformate fueling of engine 20 during cold start allows ultra-lean operation even in a cold engine, due to the wide flammability limits of hydrogen. Cold start hydrocarbon emissions are low with reformate fueling because reformate comprises only trace levels of hydrocarbons. Cold start NOx emissions are also very low due to the cooler, ultra-lean flame. FIG. 24 provide graphic emissions and catalyst heating data for the present system and method compared with conventional gasoline fueling. FIGS. 2 and 3 show cold start results from engine dynamometer tests comparing engine operation with reformate compared to gasoline. Hydrocarbon mass emissions are 90% lower with reformate fueling and NOx mass emissions are 98% lower with reformate fueling compared to gasoline fueling. Additional data regarding emissions and accelerated catalyst heating for the present system and strategy may be found in Kirwan, et al., SAE Paper 1999-01-2927, *Advanced Engine anagement Using On Board Gasoline Partial Oxidation Reforming for Meeting Super-ULEV* (SULEV) Emissions Standards, hereby incorporated by reference herein in its entirety. Additional information may further be found in Grieve, et al., *Integration of a small on board reformer to a conventional gasoline internal combustion engine system to enable a practical and robust nearly-zero emission vehicle*, paper presented at Global Powertrain Congress, Stuttgart, Germany, Oct. 5–7, 1999, which paper is hereby incorporated by reference herein in its entirety.

Figure 4:
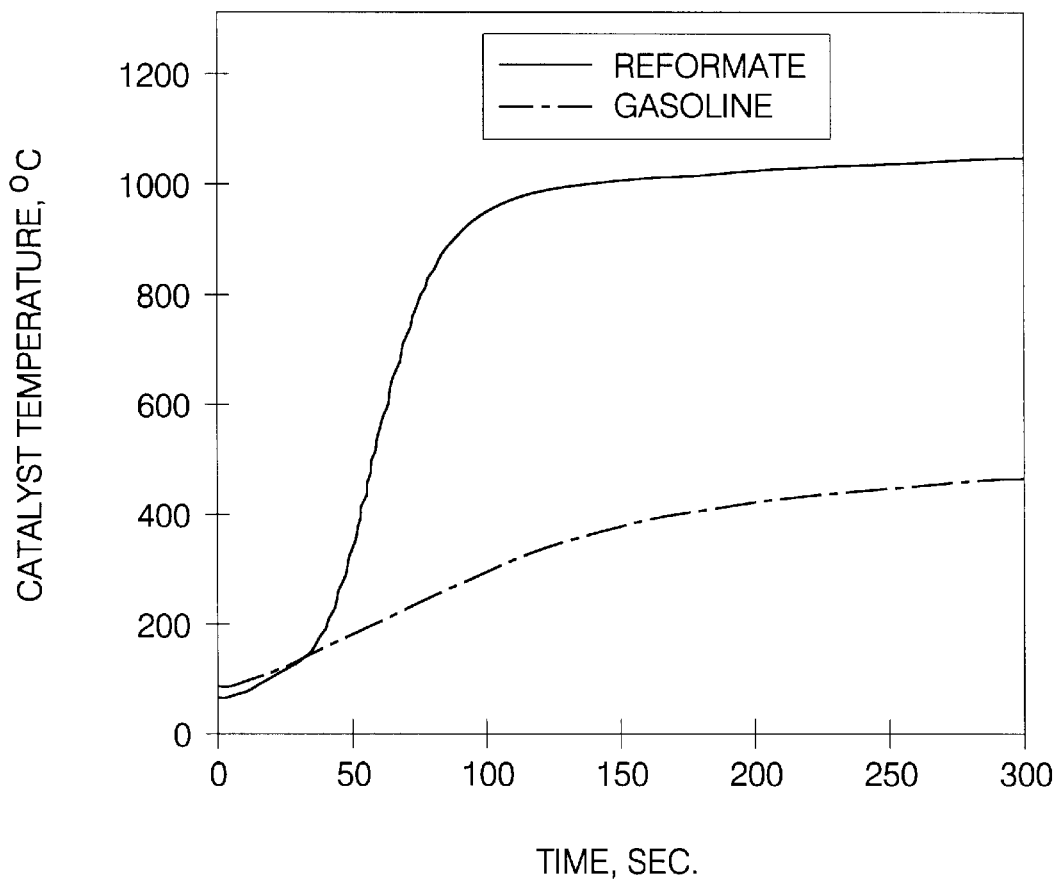
FIG. 4 is a graph showing an exhaust catalyst heating rate achieved with lean reformate fueling and accelerated catalyst heating by supplying reformate and exhaust to the catalyst compared with gasoline fueling.

In addition to reformate fueling of engine 20, the present system further comprises accelerated exhaust catalyst 24 heating by providing reformate 18b to the engine exhaust 22 for a period of time. Reformate 18b reacts with the excess air on the catalyst surface to provide very rapid exhaust catalyst 24 heating. FIG. 4 shows cold start results from engine dynamometer tests showing the catalyst heating rate improvement with reformate compared with gasoline. An overall lean (air to total reformate) condition is maintained at the catalyst. A short delay in delivering reformate 18b to the catalyst 24 may be necessary for the catalyst 24 to heat slightly and begin reacting with the reformate 18b. In one embodiment, a glow plug or other ignition source 28 is provided to initially ignite the reformate-exhaust mixture 22. Once catalyst 24 is sufficiently heated, reformate 18b is turned off to the exhaust stream 22.

During engine 20 warm-up, start, idle, and under lower engine loads, the preferred mode of engine operation is with 100% reformate 18a. Like all gaseous fuels, reformate 18a displaces air to the engine 20 and thus decreases maximum engine power. Therefore, at higher engine loads, the present control system blends gasoline 14b with reformate 18a to meet engine torque requirements while maintaining very lean engine operation. Reformate 18b is supplied to the exhaust 22 with an overall lean condition at the catalyst 24) until the catalyst 24 is sufficiently heated to provide good conversion of hydrocarbons, carbon monoxide, and NOx.

The present system provides very low engine-out emissions and therefore is particularly advantageous for meeting SULEV with larger, higher emitting vehicles. Further, by attacking engine-out emissions, the present system also provides low emissions during off-cycle conditions (i.e., conditions not covered by the U.S. FTP emissions test) and during failure modes of the exhaust after-treatment system.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of following claims.

What is claimed is:

1. An integrated fuel reformer-engine system characterized by:
    an on-board catalytic partial oxidation fuel reformer for receiving a supply of hydrogen-containing liquid fuel and a supply of air and converting same into a hydrogen-rich reformate;
    an engine having a reformate intake, a liquid fuel intake, an air intake, and an exhaust outlet;
    an exhaust catalyst having an intake for receiving said engine exhaust, said reformate, or a combination thereof, and an outlet for discharging said exhaust after treatment; and
    control means for adjusting the supply of air and one or a combination of said reformate and said liquid fuel to said engine and for adjusting the supply of reformate to said exhaust catalyst to provide non-stoichiometric lean fueling of said engine and provide low hydrocarbon and NOx emissions over a range of operating conditions from cold-start through to high engine loads;
    wherein said control means is configured to supply said reformate to said exhaust catalyst for a time sufficient to warm said exhaust catalyst to operational temperature.

2. The system of claim 1, wherein said control means is configured to supply said engine with substantially 100% reformate fueling during cold-start, idle, and low engine load operating conditions and is further configured to supply said engine with a combination of said liquid fuel and said reformate as needed to meet engine requirements during vehicle road-load conditions.

3. The system of claim 1, further comprising:
    a small supply of reformate configured to supply said engine, said exhaust catalyst, or a combination thereof, with reformate during periods when said on-board reformer is not operational.

4. The system of claim 1, further comprising:
    an ignition source disposed between said engine exhaust outlet and said exhaust catalyst for igniting said engine exhaust and reformate to enable said engine exhaust and reformate to heat said exhaust catalyst.

5. A method for operating an integrated fuel reformer-engine system comprising:
    producing a hydrogen-rich reformate fuel with an on-board catalytic partial oxidation fuel reformer;
    fueling an engine using said reformate, a liquid fuel, or a combination thereof, said engine having a reformate fuel intake, a liquid fuel intake, an air intake, and an exhaust;
    treating engine exhaust, reformate, or a combination thereof, in an exhaust catalyst having an intake for receiving said engine exhaust, said reformate, or a combination thereof, and an outlet for passing a treated stream; and
    controlling the supply to said engine and said exhaust catalyst of one or a combination of said reformate, said liquid fuel, and air to provide non-stoichiometric lean fueling of said engine and achieve low hydrocarbon and NOx emissions over a range of engine operating conditions from cold-start to high engine loads;
    wherein said controlling comprises controlling the supply of said reformate, said liquid fuel, or a combination thereof, to said engine so as to supply said engine with substantially 100% reformate fueling during starting, idling, and low engine load operating conditions and to supply said engine with a combination of said liquid fuel, said reformate, and recirculated exhaust gas fueling, as needed, during medium to high engine load conditions.

6. The method of claim 5, further comprising:
    supplying said engine, said exhaust catalyst, or a combination thereof, with reformate from a small on-board supply of reformate until said on-board fuel reformer is operational.

7. The method of claim 5, further comprising:
accelerated heating of said exhaust catalyst during cold start.

8. The method of claim 7, wherein said accelerated heating comprises mixing reformate with said engine exhaust and heating said exhaust catalyst with said mixture; igniting said engine exhaust and heating said exhaust catalyst with said ignited exhaust; or a combination thereof.

* * * * *